United States Patent
Jin et al.

(10) Patent No.: US 11,631,975 B2
(45) Date of Patent: Apr. 18, 2023

(54) DIRECT CURRENT BUS VOLTAGE CONTROL

(71) Applicant: Rockwell Automation Technologies, Inc., Mayfield Heights, OH (US)

(72) Inventors: Lei Jin, Shanghai (CN); Julie Haihui Lu, Shanghai (CN); Ahmed Mohamed Sayed Ahmed, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 56 days.

(21) Appl. No.: 17/193,854

(22) Filed: Mar. 5, 2021

(65) Prior Publication Data
US 2022/0285935 A1  Sep. 8, 2022

(51) Int. Cl.
*H02J 1/02*  (2006.01)
(52) U.S. Cl.
CPC ..................... *H02J 1/02* (2013.01)
(58) Field of Classification Search
CPC ........................................................ H02J 1/02
USPC ......................................................... 700/298
See application file for complete search history.

(56) References Cited

U.S. PATENT DOCUMENTS

| 2013/0181654 A1* | 7/2013 | Rozman | H02M 5/4585 |
| | | | 318/721 |
| 2020/0303943 A1 | 9/2020 | Jin et al. | |

FOREIGN PATENT DOCUMENTS

EP  3796538 A1  3/2021

OTHER PUBLICATIONS

"Extended European Search Report", European Patent Office, dated Aug. 1, 2022, pp. 1-10.

* cited by examiner

*Primary Examiner* — Hal Kaplan
(74) *Attorney, Agent, or Firm* — Kunzler Bean & Adamson; Scott D. Thorpe (57) ABSTRACT

For Direct Current (DC) bus voltage control, a method generates a q-axis reference current from a DC voltage error that includes a DC voltage input modified by a DC bus voltage in a closed outer loop. The method further generates a d-axis reference current from the DC voltage error, wherein the second-order harmonic in the d-axis reference current is delayed from that in q-axis reference current by 90 degrees. The method generates a q-axis current from the q-axis reference current. The method generates a d-axis current from the d-axis reference current. The second-order harmonic in d-axis current is offset from the second-order harmonic in q-axis current by 90 degrees. The method controls the DC bus voltage of a voltage control plant to mitigate a second-order harmonic in the DC bus voltage with the second-order harmonics in the q-axis current and the d-axis current.

20 Claims, 10 Drawing Sheets

DIRECT CURRENT BUS VOLTAGE CONTROL

BACKGROUND INFORMATION

The subject matter disclosed herein relates to Direct Current (DC) bus voltage control and more particularly DC bus voltage control for grid connected converters.

BRIEF DESCRIPTION

A method for DC bus voltage control is disclosed. The method generates, using a voltage regulator, a q-axis reference current $i^*_q$ from a DC voltage error $V'_{DC}$ comprising a DC voltage input V*dc modified by a DC bus voltage in a closed outer loop. The method further generates, using the voltage regulator, a d-axis reference current $i^*_d$ from the DC voltage error, wherein the second-order harmonic in the d-axis reference current $i^*_d$ is delayed from that in q-axis reference current $i^*_q$ by 90 degrees. The method generates a q-axis current $i_q$ from the q-axis reference current $i^*_q$ with a second inner-loop current control. The method generates a d-axis current $i_d$ from the d-axis reference current $i^*_d$ with a first inner-loop current control. The second-order harmonic in d-axis current $i_d$ is offset from the second-order harmonic in q-axis current $i_q$ by 90 degrees. The method controls the DC bus voltage of a voltage control plant to mitigate a second-order harmonic in the DC bus voltage with the second-order harmonics in the q-axis current $i_q$ and the d-axis current $i_d$.

An apparatus for DC bus voltage control is disclosed. The apparatus includes a voltage regulator, a second inner-loop current control, and a first inner-loop current control. The voltage regulator generates a q-axis reference current $i^*_q$ from a DC voltage error $V'_{DC}$ comprising a DC voltage input V*dc modified by a DC bus voltage in a closed outer loop and generates a d-axis reference current $i^*_d$ from the DC voltage error, wherein the second-order harmonic in the d-axis reference current $i^*_d$ is delayed from that in q-axis reference current $i^*_q$ by 90 degrees. The second inner-loop current control generates a q-axis current $i_q$ from the q-axis reference current $i^*_q$. The first inner-loop current control generates a d-axis current $i_d$ from the d-axis reference current $i^*_d$. The second-order harmonic in d-axis current $i_d$ is offset from the second-order harmonic in q-axis current $i_q$ by 90 degrees. The first and second inner-loop current controlling the DC bus voltage of a voltage control plant to mitigate a second-order harmonic in the DC bus voltage with the second-order harmonics in the q-axis current $i_q$ and the d-axis current $i_d$.

A computer program product for DC bus voltage control is also disclosed. The computer program product includes a computer readable storage medium having program code embodied therein, the program code readable/executable by a processor. The processor generates a q-axis reference current $i^*_q$ from a DC voltage error V'Dc comprising a DC voltage input V*dc modified by a DC bus voltage in a closed outer loop. The processor generates a d-axis reference current $i^*_d$ from the DC voltage error, wherein the second-order harmonic in the d-axis reference current $i^*_d$ is delayed from that in q-axis reference current $i^*_q$ by 90 degrees. The processor generates a q-axis current $i_q$ from the q-axis reference current $i^*_q$. The processor generates a d-axis current $i_d$ from the d-axis reference current $i^*_d$, wherein the second-order harmonic in d-axis current $i_d$ is offset from the second-order harmonic in q-axis current $i_q$ by 90 degrees. The processor controls the DC bus voltage of a voltage control plant to mitigate a second-order harmonic in the DC bus voltage with the second-order harmonics in the q-axis current $i_q$ and the d-axis current $i_d$.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

Figure 1A:
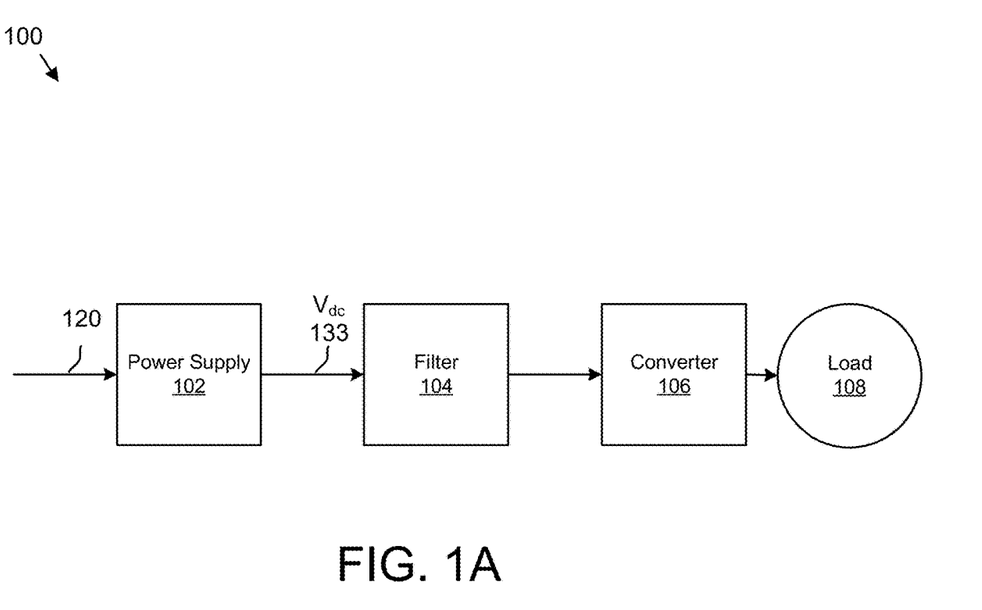
FIG. 1A is a schematic block diagram of a power system according to an embodiment.

FIG. 1A is a schematic block diagram of power system 100. In the depicted embodiment, a power supply 102 generates a DC bus voltage $V_{DC}$ 133 from grid voltages 120. The DC bus voltage $V_{DC}$ 133 may be filtered by a filter 104 to power a converter 106 that supplies power to a load 108. The DC bus voltage $V_{DC}$ 133 may include significant second-order harmonic oscillation as a result of unbalanced grid voltages 120. In addition, an imbalance in the impedance between the grid voltages 120 and the filter 104 may generate significant second-order harmonic oscillation. The second-order harmonic oscillation typically requires increased capacitance in the filter 104, increasing the cost of the filter 104. In addition, the second-order harmonic oscillation may reduce the life of the filter 104, reducing the reliability of the power system 100 and increasing maintenance costs. The second-order harmonic oscillation may also affect the load 108.

The embodiments described herein mitigate the second-order harmonic oscillation in the DC bus voltage 133 with second-order harmonics in a q-axis current and a d-axis current as will be described hereafter. As a result, the cost of the filter 104 and filter maintenance is reduced. In addition, the reliability of the power system 100 is increased.

Figure 1B:
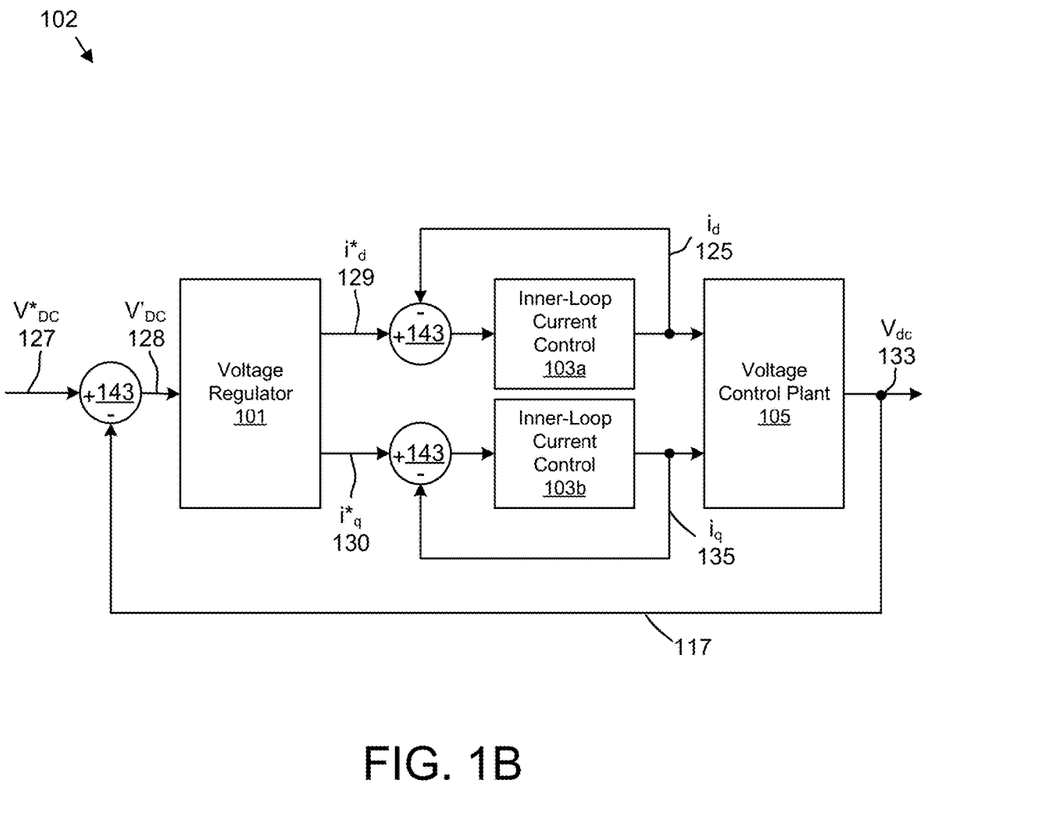
FIG. 1B is a schematic block diagram of a power supply according to an embodiment.

FIG. 1B is a schematic block diagram of the power supply 102 of FIG. 1A. The power supply 102 receives a DC voltage input $V^*_{dc}$ 127. The DC voltage input $V^*_{dc}$ 127 is modified by the DC bus voltage $V_{DC}$ 133 in a closed outer loop 117 to generate a DC voltage error $V'_{DC}$ 128 that drives a voltage regulator 101. Arithmetic functions 143 may add and/or subtract values and/or signals. The arithmetic functions 143 may be performed by electronic components and/or a computer.

The voltage regulator 101 generates a q-axis reference current i*$_q$ 130 and a d-axis reference current i*$_d$ 129 as will be described hereafter in FIG. 2A. In one embodiment, the voltage regulator 101 may generate the q-axis reference current i*$_q$ 130 and the d-axis reference current i*$_d$ 129 from the DC voltage error V'$_{DC}$ 128 as a function of a proportional plus integral plus resonant (PIR) controller and a d-axis current reference input as will be described hereafter.

The q-axis reference current i*$_q$ 130 minus a q-axis current i$_q$ 135 drives a second inner-loop current control 103b to generate the q-axis current i$_q$ 135. The d-axis reference current i*$_d$ 129 minus a d-axis current i$_d$ 125 drives a first inner loop current control 103a to generate the d-axis current i$_d$ 125. The first and second inner-loop current controls 103a-b are described in more detail in FIG. 2B.

The second-order harmonic in d-axis current i$_d$ 125 is offset from the second-order harmonic in q-axis current i$_q$ 135 by 90 degrees. As a result, the second-order harmonics in the d-axis current i$_d$ 125 and the q-axis current i$_q$ 135 are canceled out. The d-axis current i$_d$ 125 and the q-axis current i$_q$ 135 control of voltage control plant 105 that generates the DC bus voltage 133, mitigating the second-order harmonics in the DC bus voltage 133.

Figure 2A:
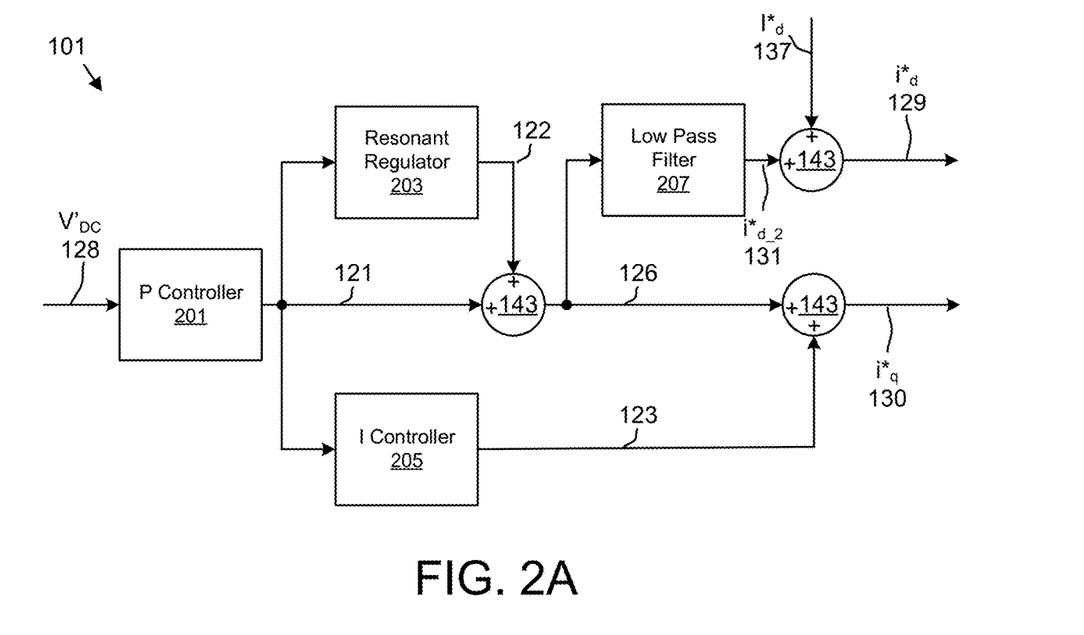
FIG. 2A is a schematic block diagram of a voltage regulator according to an embodiment.

FIG. 2A is a schematic block diagram of the voltage regulator 101 of FIG. 1B. In the depicted embodiment, a proportional controller 201 receives the DC voltage error V'$_{DC}$ 128 and generates a proportional error 121. A resonant regulator 203 generates a regulated harmonic current 122 from the proportional error 121. In one embodiment, the resonant regulator 203 implements the function G$_r$(s) as shown in Equation 1, where s is a transfer function, k$_r$ is a proportional constant, $\Delta\theta$ is a compensation angle, and $\omega_e$ is an estimated grid fundamental frequency.

$$G_r(s) = k_r \cdot \frac{s \cdot \cos(\Delta\theta) - (2\omega_e) \cdot \sin(\Delta\theta)}{s^2 + (2\omega_e)^2} \qquad \text{Equation 1}$$

In an alternate embodiment, the resonant regulator 203 implements the function G$_r$(s) as shown in Equation 2 for a compensation angle $\Delta\theta$ of 180 degrees.

$$G_r(s)|_{\Delta\theta=180°} = -\frac{k_r \cdot s}{s^2 + (2\omega_e)^2} \qquad \text{Equation 2}$$

A q-axis intermediate current 126 is generated from the proportional error 121. In the depicted embodiment, the q-axis intermediate current 126 is the sum of the proportional error 121 and the regulated harmonic current 122.

An integral controller 205 filters the proportional error 121 to generate an integrated current reference 123. The q-axis reference current i*$_q$ 130 is generated as the sum of the q-axis intermediate current 126 and the integrated current reference 123.

The q-axis intermediate current 126 may be filtered with a low-pass filter 207 to generate a d-axis intermediate current 131. In one embodiment, the low-pass filter 207 implements the function G$_t$(s) as shown in Equation 3, where s is the transfer function, k is a constant, and $\omega_e$ is the estimated grid fundamental frequency.

$$G_t(s) = \frac{k(2\omega_e)^2}{s^2 + k(2\omega_e)s + (2\omega_e)^2} \qquad \text{Equation 3}$$

The d-axis reference current i*$_d$ 129 is generated as a sum of the d-axis intermediate current 131 and a d-axis current reference input 137. The second-order harmonic in d-axis current i$_d$ 125 is offset from the second-order harmonic in q-axis current i$_q$ 135 by 90 degrees.

Figure 2B:
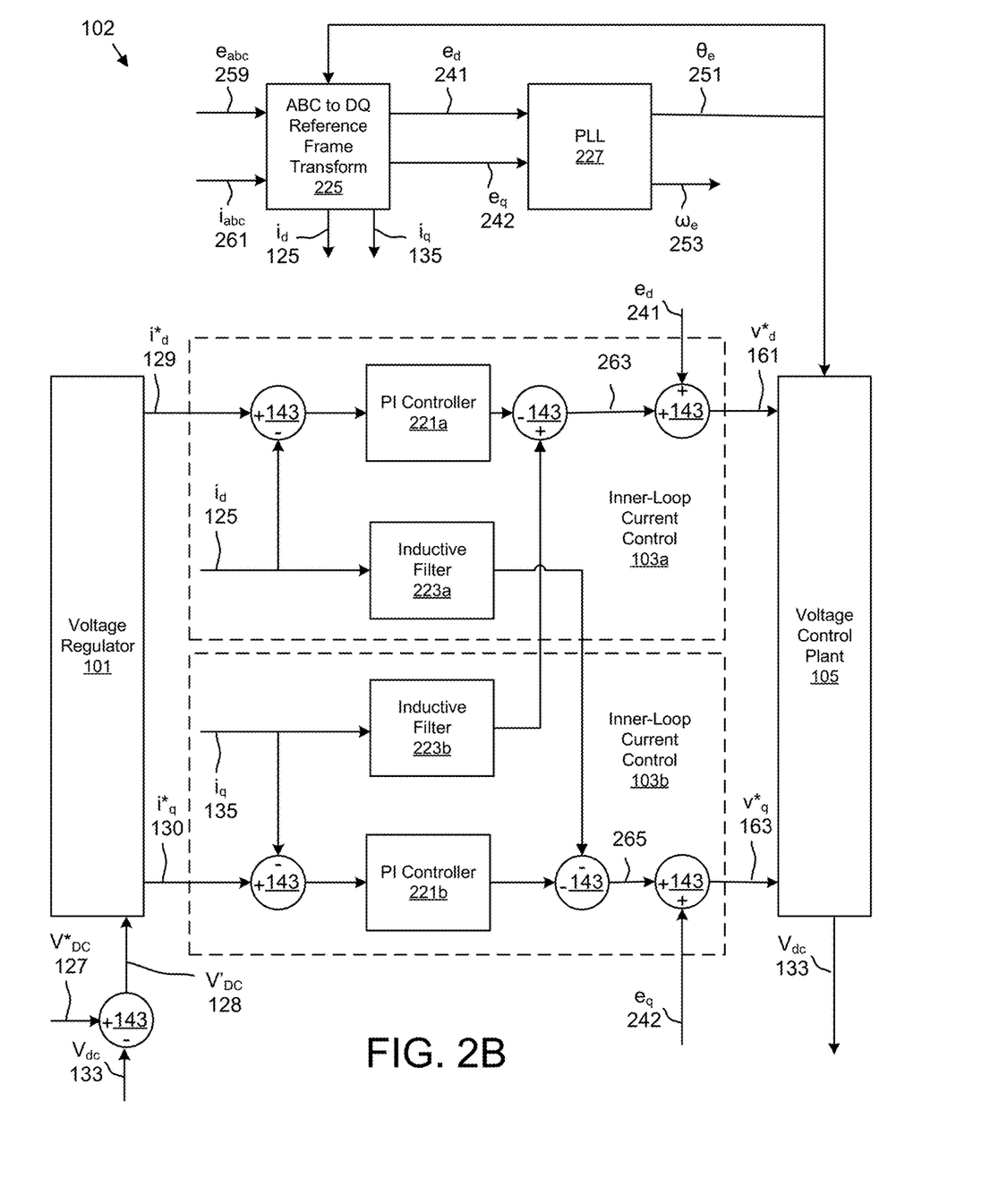
FIG. 2B is a schematic block diagram of a control system according to an embodiment.

FIG. 2B is a schematic block diagram of the power supply 102. The DC voltage error V'$_{DC}$ 128 comprising the DC voltage input V*dc 127 modified by a DC bus voltage 133 is received by the voltage regulator 101. The voltage regulator 101 may generate the q-axis reference current i*$_q$ 130 and the d-axis reference current i*$_d$ 129 from the DC voltage error 128 as a function of a proportional plus integral plus resonant (PIR) controller and the d-axis current reference input 137. The voltage regulator 101 may generate the q-axis reference current i*$_q$ 130 and the d-axis reference current i*$_d$ 129 as shown in FIG. 2A.

In one embodiment, an abc to dq reference frame transform 225 receives a three-phase grid voltage e$_{abc}$ 259 and a three-phase current i$_{abc}$ 261 of the grid voltage 120. The abc to dq reference frame transform 225 generates a d-axis current i$_d$ 125, a q-axis current i$_q$ 135, a d-axis grid voltage e$_d$ 241, and a q-axis grid voltage e$_q$ 242. In one embodiment, the d-axis current i$_d$ 125 and the q-axis current i$_q$ 135 are determined using Equation 4, where i$_a$, i$_b$, i$_c$ are the three phase currents of the three-phase current i$_{abc}$ 261 and $\theta_e$ is a grid-voltage phase angle $\theta_e$ 205.

$$\begin{bmatrix} i_d \\ i_q \end{bmatrix} = \frac{2}{3} \begin{bmatrix} \cos(\theta_e) & \cos\left(\theta_e - \frac{2\pi}{3}\right) & \cos\left(\theta_e + \frac{2\pi}{3}\right) \\ -\sin(\theta_e) & -\sin\left(\theta_e - \frac{2\pi}{3}\right) & -\sin\left(\theta_e + \frac{2\pi}{3}\right) \end{bmatrix} \begin{bmatrix} i_a \\ i_b \\ i_c \end{bmatrix} \qquad \text{Equation 4}$$

A Phase Lock Loop (PLL) 227 generates the estimated grid fundamental frequency W$_e$ 253 and the grid-voltage phase angle $\theta_e$ 205 based on the d-axis grid voltage e$_d$ 241 and the q-axis grid voltage e$_q$ 242.

The first inner-loop current control 103a subtracts the d-axis current i$_d$ 125 from the d-axis reference current i*$_d$ 129 and modifies the difference with a first proportional/integral controller 221a. The output of the first proportional/integral controller 221a is subtracted from a q-axis current i$_q$ 135 multiplied by the filter inductive reactance 223b to generate a d-axis output 263. The d-axis output 263 is summed with a d-axis grid voltage 241 to generate the d-axis voltage output V*$_d$ 161.

The second inner-loop current control 103b subtracts the q-axis current i$_q$ 135 from the q-axis reference current i*$_q$ 130 and modifies the difference with a second proportional/integral controller 221b. The output of the second proportional/integral controller 221b is subtracted from the opposite of the d-axis current i$_d$ 125 multiplied by the filter inductive reactance 223a to generate a q-axis output 265. The q-axis output 265 is summed with the q-axis grid voltage 242 to generate the q-axis voltage output V*$_q$ 163.

Because the second-order harmonic in d-axis current i$_d$ 125 is offset from the second-order harmonic in q-axis current i$_q$ 135 by 90 degrees, the second-order harmonics in the d-axis voltage output V*$_d$ 161 and the q-axis voltage output V*$_q$ 163 are mutually canceled out by the voltage control plant 105 which receives the d-axis voltage output V*$_d$ 161 and the q-axis voltage output V*$_q$ 163 and generates the DC bus voltage V$_{DC}$ 133 with reduced second-order harmonics.

Figure 3:
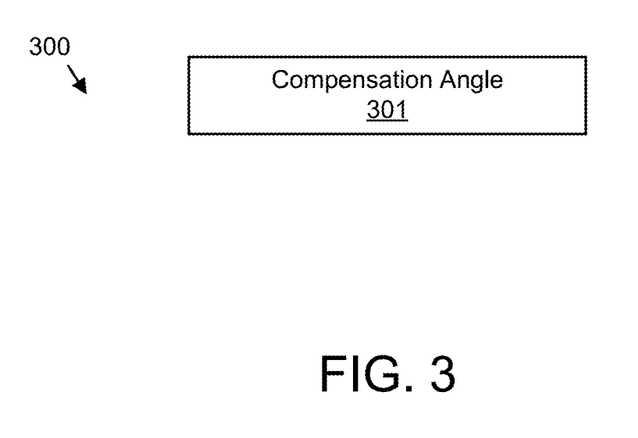
FIG. 3 is a schematic block diagram of control data according to an embodiment.

FIG. 3 is a schematic block diagram of control data 300. The control data 300 may be used to control the DC bus voltage 133 of the voltage control plant 105. The control data 300 may be organized as a data structure in a memory. In the depicted embodiment, the control data 300 includes the compensation angle Δθ 301. The compensation angle Δθ 301 may be employed by the resonant regulator 203 as described in Equation 1. In one embodiment, the resident regulator 203 may be 180 degrees to in Equation 2.

Figure 4:
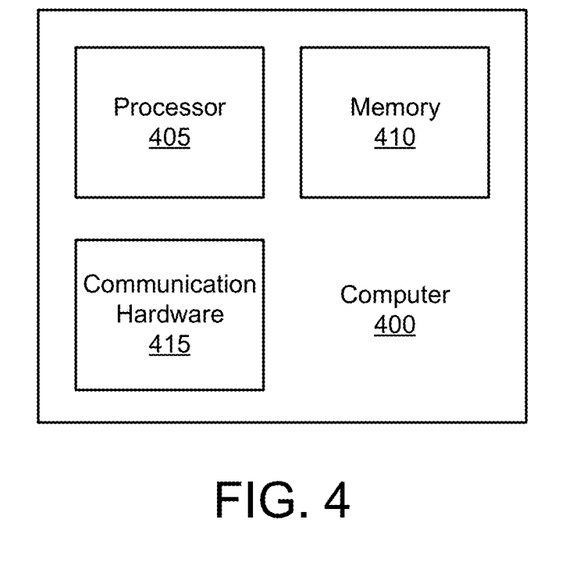
FIG. 4 is a schematic block diagram of a computer according to an embodiment.

FIG. 4 is a schematic block diagram of a computer 400. The computer 400 may perform one or more functions for the power supply 102, the voltage regulator 101, and/or the inner-loop current controls 103a-b. In the depicted embodiment, the computer 400 includes a processor 405, a memory 410, and communication hardware 415. The memory 410 may store code and data. The processor 405 may execute the code and process the data. The communication hardware 415 may communicate with other devices.

Figure 5A:
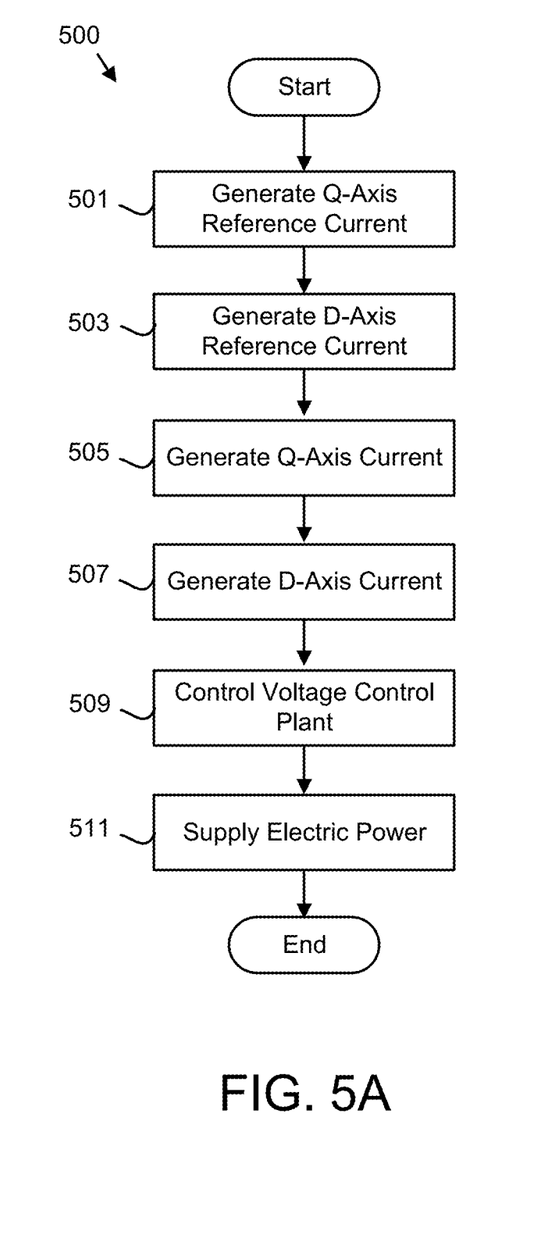
FIG. 5A is a schematic flow chart diagram of a voltage control method according to an embodiment.

FIG. 5A is a schematic flow chart diagram of a voltage control method 500. The method 500 may control the DC bus voltage 133 of the voltage control plant 105 to mitigate second-order harmonics. The method 500 may be performed by the power supply 102 and/or elements thereof. In one embodiment, the method 500 is performed by the computer 400 performing the functions of the voltage regulator 101, the first and second inner loop current controls 103a-b, the ABC to DQ reference frame transform 225, and/or the PLL 227.

The method 500 starts, and in one embodiment, the voltage regulator 101 generates 501 the q-axis reference current i*$_q$ 130 from the DC voltage error V'$_{DC}$ 128. The DC voltage error V'$_{DC}$ 128 may comprise the DC voltage input V*dc 127 modified by the DC bus voltage 133 in the closed outer loop 117 as shown in FIG. 1B. Embodiments of the generation 501 the q-axis reference current i*$_q$ 130 are described in more detail in FIG. 5B.

The voltage regulator 101 may further generate 503 the d-axis reference current i*$_d$ 129 from the DC voltage error 128. The second-order harmonic in the d-axis reference current i*$_d$ 129 is delayed from that in q-axis reference current i*$_q$ 130 by 90 degrees. Embodiments of the generation 503 of the d-axis reference current i*$_d$ 129 are described in more detail in FIG. 5B.

The second inner loop current control 103b may generate 505 the q-axis current i$_q$ 135 from the q-axis reference current i*$_q$ 130 such as is shown in FIG. 2B. In addition, the first inner loop current control 103a may generate 507 the d-axis current i$_d$ 125 from the d-axis reference current i*$_d$ 129.

The first and second inner loop current controls 103a-b may control 509 the DC bus voltage 133 of the voltage control plant 105 by mitigating a second-order harmonic in the DC bus voltage 133 with the second-order harmonics in the q-axis current i$_q$ 135 and the d-axis current i$_d$ 125. As a result, the second-order harmonics in the DC bus voltage 133 are reduced. The power supply 102 further supplies 511 electric power to the load 108 as shown in FIG. 1A.

Figure 5B:
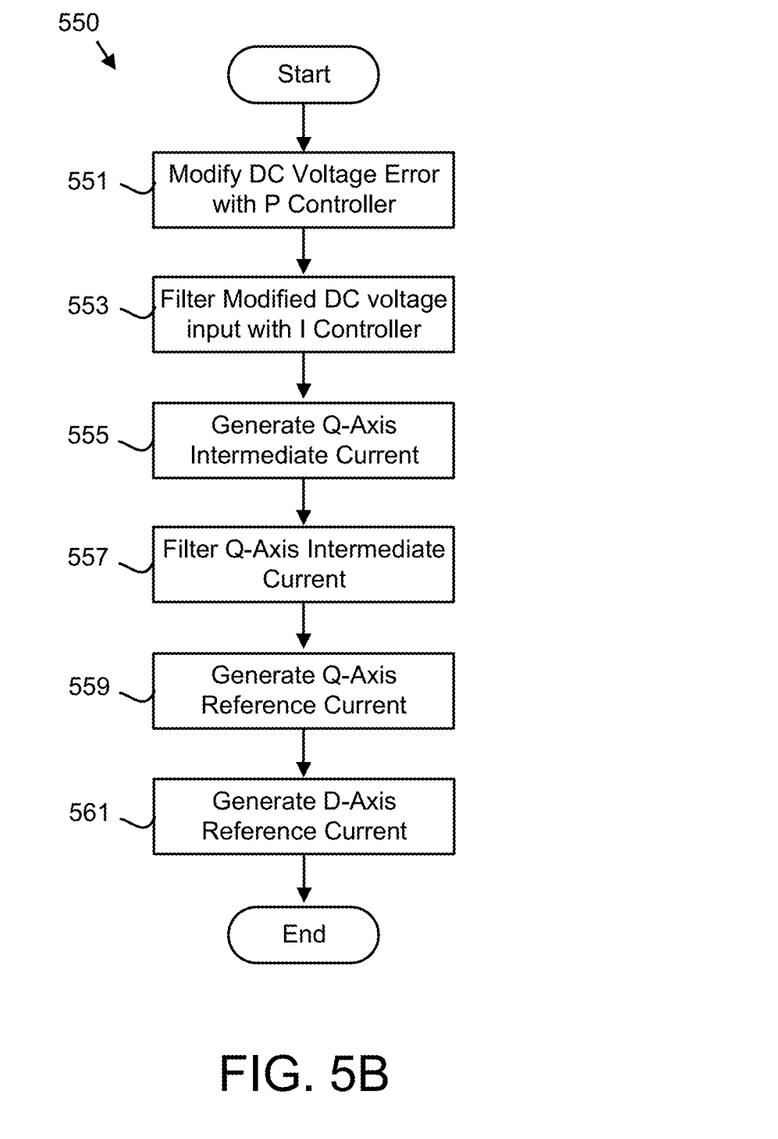
FIG. 5B is a schematic flow chart diagram of a reference current generation method according to an embodiment.

FIG. 5B is a schematic flow chart diagram of a reference current generation method 550. The method 550 may generate the q-axis current i$_q$ 135 and the d-axis current i$_d$ 125. In one embodiment, the method 550 performs steps 501 and 503 of FIG. 5A. The method 550 may be performed by the power supply 102 and/or elements thereof. In one embodiment, the method 550 is performed by the computer 400 performing the functions of the voltage regulator 101.

The method 550 starts, and in one embodiment, the proportional controller 201 modifies 551 the DC voltage error 128 to generate the proportional error 121. The integral controller 205 may filter 553 the proportional error 121 to generate the integrated current reference 123.

An arithmetic function 143 may generate 555 the q-axis intermediate current 126 from the proportional error 121. In one embodiment, the q-axis intermediate current 126 is generated as the sum of the proportional error 121 and the regulated harmonic current 122 generated from the proportional error 121 regulated by the resonant regulator 203. The resonant regulator 203 may implement Equations 1 or Equation 2.

The low-pass filter 207 may filter 557 the q-axis intermediate current 126 with the low-pass filter 207 to generate the d-axis intermediate current 131. The low-pass filter 207 may implement Equation 3. The d-axis intermediate current 131 may be generated from the harmonic current 122 filtered by the low-pass filter 207. In addition, the q-axis intermediate current 126 is generated as a sum of the proportional error 121 and a regulated harmonic current 122 generated from the proportional error 121 regulated by a resonant regulator 203.

An arithmetic function 143 may generate 559 the q-axis reference current i*$_q$ 130 as the sum of the q-axis intermediate current 126 and the integrated current reference 123. An arithmetic function 143 may further generate 561 the d-axis reference current i*$_d$ 129 as the sum of the d-axis intermediate current 131 and the d-axis current reference input 137 and the method 550 ends.

Figure 6A:
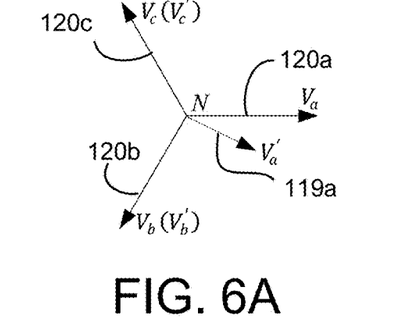
FIG. 6A is a voltage phasor diagram according to an embodiment.
Figure 6B:
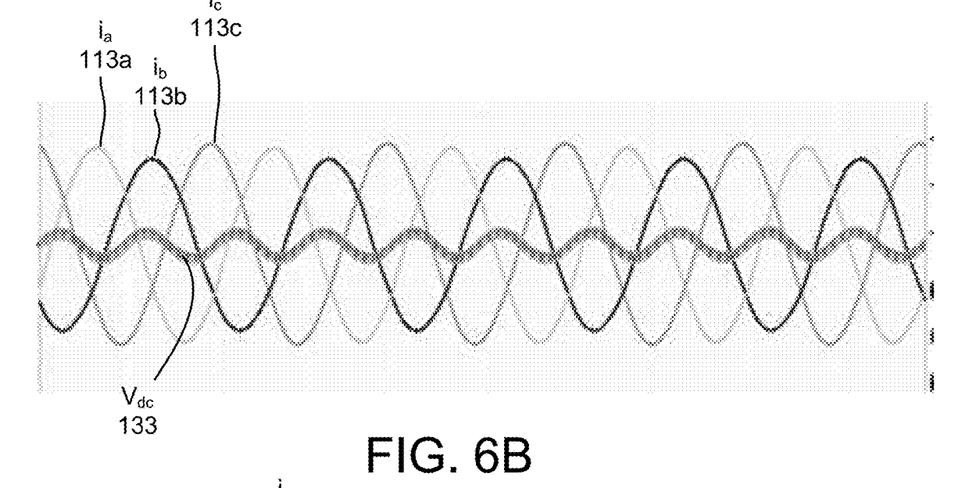
FIG. 6B is waveforms for a prior art Direct Current (DC) bus voltage according to an embodiment.
Figure 6C:
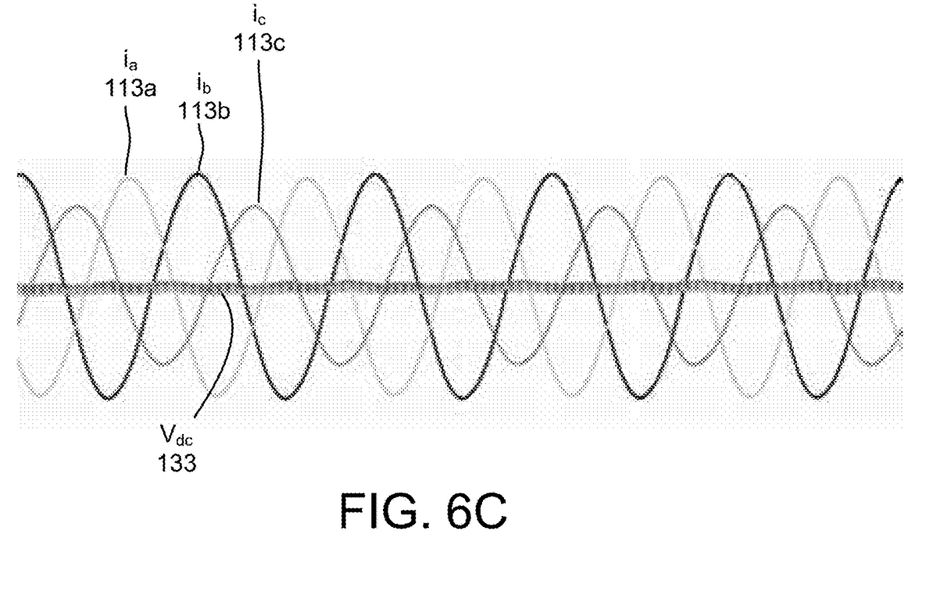
FIG. 6C is waveforms for a DC bus voltage according to an embodiment.

FIG. 6A is a voltage phasor diagram showing voltage phases for FIGS. 6B-C. The three-phase grid voltages 120a-c are shown with an A phase voltage imbalance 119a.

FIG. 6B is waveforms 700 for a DC bus voltage 133 and three-phase plant currents 113a-c of the voltage control plant 105 for the voltage phasor diagram of FIG. 6A using prior art control. The waveforms 700 are for a 30 percent voltage sag. A second-order harmonic is shown in the DC bus voltage 133.

FIG. 6C is waveforms for a DC bus voltage 133 and three-phase plant currents 113a-c of the voltage control plant 105 for the voltage phasor diagram of FIG. 6A using the embodiments. The waveforms are for a 30 percent voltage sag. As shown, the second-order harmonic of FIG. 6B is mitigated.

Figure 7A:
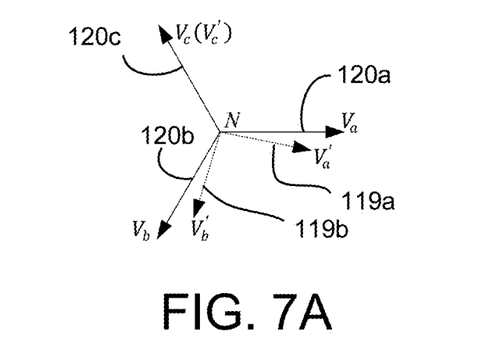
FIG. 7A is a voltage phasor diagram according to an embodiment.
Figure 7B:
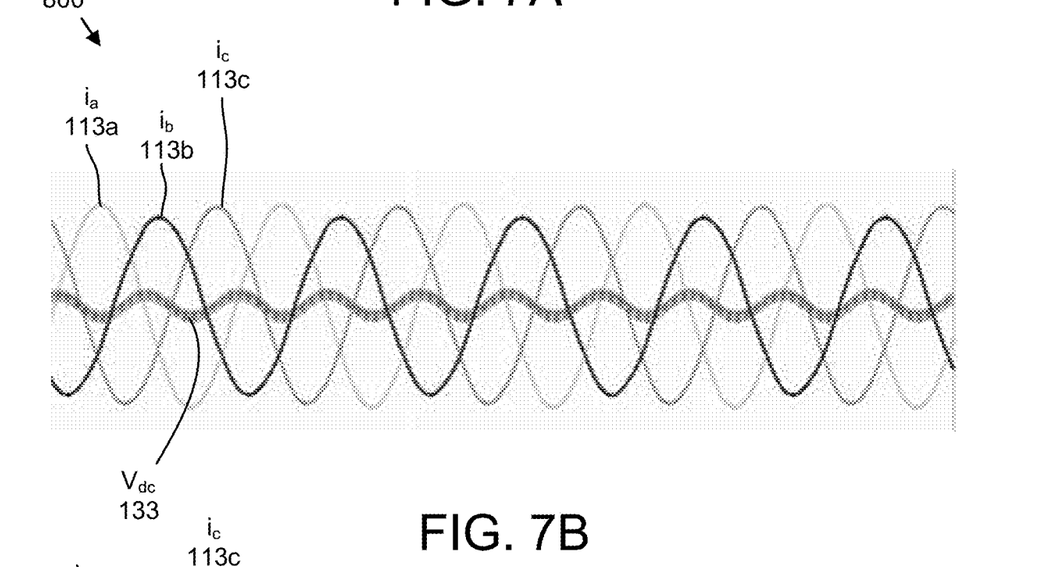
FIG. 7B is waveforms for a prior art DC bus voltage according to an embodiment.
Figure 7C:
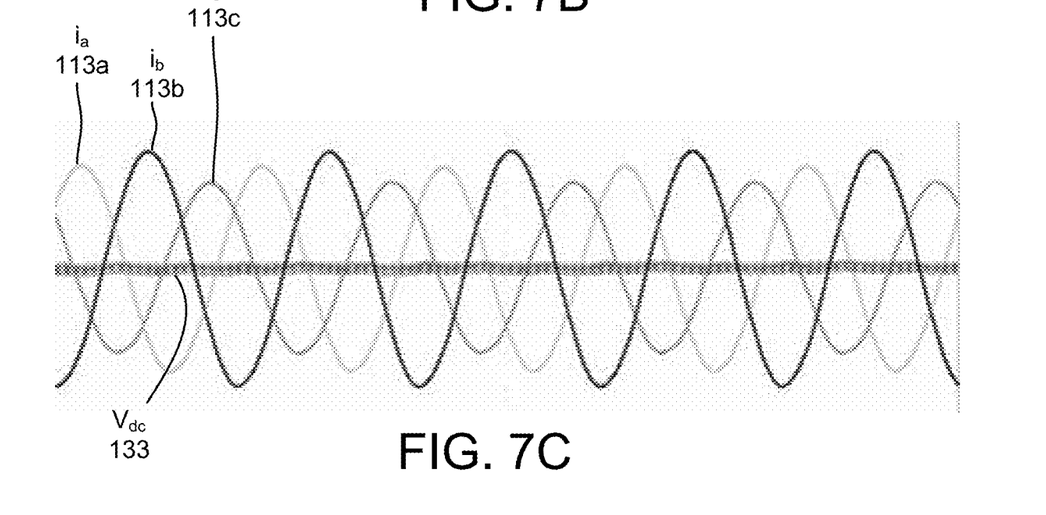
FIG. 7C is waveforms for a DC bus voltage according to an embodiment.

FIG. 7A is a voltage phasor diagram for FIGS. 7B-C. The three-phase grid voltages 120a-c are shown with A and B phase voltage imbalances 119a-b.

FIG. 7B is waveforms 800 for a DC bus voltage 133 and three-phase plant currents 113a-c of the voltage control plant 105 for the voltage phasor diagram of FIG. 7A using prior art control. The waveforms 800 are for a 30 percent voltage sag. A second-order harmonic is shown in the DC bus voltage 133.

FIG. 7C is waveforms for a DC bus voltage 133 and three-phase plant currents 113a-c of the voltage control plant 105 for the voltage phasor diagram of FIG. 7A using the embodiments. The waveforms are for a 30 percent voltage sag. As shown, the second-order harmonic of FIG. 6B is mitigated.

Problem/Solution

An imbalance in the grid voltages 120 may generate significant second-order harmonic oscillation. The imbalance may be caused by an imbalance in the impedance between the grid voltages 120 and the filter 104. Filtering out the second-order harmonic oscillation typically requires a more costly capacitor in the filter 104. In addition, the second-order harmonic oscillation may reduce the life of the filter 104, reducing the reliability of the power system 100 and increasing maintenance costs.

The embodiments mitigate the second-order harmonic oscillation in the DC bus voltage 133 with second-order harmonics in a q-axis current 135 and a d-axis current 125. As a result, the cost of the filter 104 and filter maintenance is reduced, increasing the cost effectiveness and reliability of the power system 100.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    generating, using a voltage regulator, a q-axis reference current from a Direct Current (DC) voltage error comprising a DC voltage input modified by a DC bus voltage in a closed outer loop;
    generating, using the voltage regulator, a d-axis reference current from the DC voltage error, wherein a second-order harmonic in the d-axis reference current is delayed from that in the q-axis reference current by 90 degrees;
    generating a q-axis current from the q-axis reference current with a second inner-loop current control for a voltage control plant, wherein the voltage control plant receives a d-axis voltage output and a q-axis voltage output and generates the DC bus voltage;
    generating a d-axis current from the d-axis reference current with a first inner-loop current control for the voltage control plant, wherein the second-order harmonic in the d-axis current is offset from the second-order harmonic in the q-axis current by 90 degrees; and
    controlling the DC bus voltage of the voltage control plant to mitigate a second-order harmonic in the DC bus voltage with the second-order harmonics in the q-axis current and the d-axis current.

2. The method of claim 1, wherein the q-axis reference current and the d-axis reference current are generated from the DC voltage error as a function of a proportional plus integral plus resonant (PIR) controller and a d-axis current reference input.

3. The method of claim 1, the method further comprising:
    modifying the DC voltage error with a proportional controller to generate a proportional error;
    filtering the proportional error with an integral controller to generate an integrated current reference;
    generating a q-axis intermediate current from the proportional error;
    filtering the q-axis intermediate current with a low-pass filter to generate a d-axis intermediate current;
    generating the q-axis reference current as a sum of the q-axis intermediate current and the integrated current reference; and
    generating the d-axis reference current as a sum of the d-axis intermediate current and a d-axis current reference input.

4. The method of claim 3, wherein the d-axis intermediate current is generated from a harmonic current filtered by the low-pass filter.

5. The method of claim 3, wherein the low-pass filter implements the function $$G_l(s) = \frac{k(2\omega_e)^2}{s^2 + k(2\omega_e)s + (2\omega_e)^2},$$

where s is a transfer function, k is a constant, and $\omega_e$ is an estimated grid fundamental frequency.

6. The method of claim 3, wherein the q-axis intermediate current is generated as a sum of the proportional error and a regulated harmonic current generated from the proportional error regulated by a resonant regulator.

7. The method of claim 6, wherein the resonant regulator implements the $$G_r(s) = k_r \cdot \frac{s \cdot \cos(\Delta\theta) - (2\omega_e) \cdot \sin(\Delta\theta)}{s^2 + (2\omega_e)^2},$$

function where s is a transfer function, $k_r$ is a proportional constant, $\Delta\theta$ is the compensation angle, and $\omega_e$ is an estimated grid fundamental frequency.

8. The method of claim 6, wherein the resonant regulator implements the $$G_r(s)|_{\Delta\theta=180°} = -\frac{k_r \cdot s}{s^2 + (2\omega_e)^2},$$

function where s is a transfer function, $k_r$ is a proportional constant, and $\omega_e$ is an estimated grid fundamental frequency.

9. The method of claim 8, wherein the compensation angle is 180 degrees.

10. An apparatus comprising:
    a voltage regulator that generates a q-axis reference current from a Direct Current (DC) voltage error comprising a DC voltage input modified by a DC bus voltage in a closed outer loop and generates a d-axis reference current from the DC voltage error, wherein a second-order harmonic in the d-axis reference current is delayed from that in the q-axis reference current by 90 degrees;
    a second inner-loop current control that generates a q-axis current from the q-axis reference current for a voltage control plant, wherein the voltage control plant receives a d-axis voltage output and a q-axis voltage output and generates the DC bus voltage; and
    a first inner-loop current control that generates a d-axis current from the d-axis reference current for the voltage control plant, wherein the second-order harmonic in the d-axis current is offset from the second-order harmonic in the q-axis current by 90 degrees, the first and second inner-loop current controlling the DC bus voltage of the voltage control plant to mitigate a second-order harmonic in the DC bus voltage with the second-order harmonics in the q-axis current and the d-axis current.

11. The apparatus of claim 10, wherein the q-axis reference current and the d-axis reference current are generated from the DC voltage error as a function of a proportional plus integral plus resonant (PIR) controller and a d-axis current reference input.

12. The apparatus of claim 10, the voltage regulator further:
- modifying the DC voltage error with a proportional controller to generate a proportional error;
- filtering the proportional error with an integral controller to generate an integrated current reference;
- generating a q-axis intermediate current from the proportional error;
- filtering the q-axis intermediate current with a low-pass filter to generate a d-axis intermediate current;
- generating the q-axis reference current as a sum of the q-axis intermediate current and the integrated current reference; and
- generating the d-axis reference current as a sum of the d-axis intermediate current and a d-axis current reference input.

13. The apparatus of claim 12, wherein the d-axis intermediate current is generated from a harmonic current filtered by the low-pass filter.

14. The apparatus of claim 12, wherein the low-pass filter implements the function $$G_f(s) = \frac{k(2\omega_e)^2}{s^2 + k(2\omega_e)s + (2\omega_e)^2},$$

where s is a transfer function, k is a constant, and $\omega_e$ is an estimated grid fundamental frequency.

15. The apparatus of claim 12, wherein the q-axis intermediate current is generated as a sum of the proportional error and a regulated harmonic current generated from the proportional error regulated by a resonant regulator.

16. A computer program product comprising a non-transitory computer readable storage medium having program code embodied therein, the program code executable by a processor to:
- generate a q-axis reference current from a Direct Current (DC) voltage error comprising a DC voltage input modified by a DC bus voltage in a closed outer loop;
- generate a d-axis reference current from the DC voltage error, wherein a second-order harmonic in the d-axis reference current is delayed from that in the q-axis reference current by 90 degrees;
- generate a q-axis current from the q-axis reference current for a voltage control plant, wherein the voltage control plant receives a d-axis voltage output and a q-axis voltage output and generates the DC bus voltage;
- generate a d-axis current from the d-axis reference current for the voltage control plant, wherein a second-order harmonic in the d-axis current is offset from the second-order harmonic in the q-axis current by 90 degrees; and
- control the DC bus voltage of the voltage control plant to mitigate a second-order harmonic in the DC bus voltage with the second-order harmonics in the q-axis current and the d-axis current.

17. The computer program product of claim 16, wherein the q-axis reference current and the d-axis reference current are generated from the DC voltage error as a function of a proportional plus integral plus resonant (PIR) controller and a d-axis current reference input.

18. The computer program product of claim 16, the processor further:
- modifying the DC voltage error with a proportional controller to generate a proportional error;
- filtering the proportional error with an integral controller to generate an integrated current reference;
- generating a q-axis intermediate current from the proportional error;
- filtering the q-axis intermediate current with a low-pass filter to generate a d-axis intermediate current;
- generating the q-axis reference current as a sum of the q-axis intermediate current and the integrated current reference; and
- generating the d-axis reference current as a sum of the d-axis intermediate current and a d-axis current reference input.

19. The computer program product of claim 18, wherein the d-axis intermediate current is generated from a harmonic current filtered by the low-pass filter.

20. The computer program product of claim 18, wherein the low-pass filter $$G_f(s) = \frac{k(2\omega_e)^2}{s^2 + k(2\omega_e)s + (2\omega_e)^2},$$

implements the function where s is a transfer function, k is a constant, and $\omega_e$ is an estimated grid fundamental frequency.

* * * * *